US012440747B1

(12) United States Patent
Lesniak

(10) Patent No.: US 12,440,747 B1
(45) Date of Patent: Oct. 14, 2025

(54) SYSTEMS AND METHODS FOR REMOTE GOLF MATCH PLAY

(71) Applicant: BIG GAME SPORT OF ARIZONA, LLC, Payson, AZ (US)

(72) Inventor: Richard Lesniak, Payson, AZ (US)

(73) Assignee: Big Game Sport of Arizona, LLC, Payson, AZ (US)

( * ) Notice: Subject to any disclaimer, the term of this patent is extended or adjusted under 35 U.S.C. 154(b) by 192 days.

(21) Appl. No.: 17/937,688

(22) Filed: Oct. 3, 2022

Related U.S. Application Data

(60) Provisional application No. 63/261,976, filed on Oct. 1, 2021.

(51) Int. Cl.
*A63B 71/00* (2006.01)
*A63B 69/36* (2006.01)
(Continued)

(52) U.S. Cl.
CPC .......... *A63B 71/0669* (2013.01); *A63B 69/36* (2013.01); *A63B 71/0616* (2013.01);
(Continued)

(58) Field of Classification Search
CPC ....... A63B 69/36; A63B 2225/20; A63F 3/08; A63F 7/0628; A63F 7/0664; A63F 13/46; A63F 13/87; A63F 13/217; A63F 13/795; A63F 13/812; A63F 2003/088; A63F 2300/572; A63F 2300/5566; A63F 2300/8011
See application file for complete search history.

(56) References Cited

U.S. PATENT DOCUMENTS

2002/0049508 A1* 4/2002 Williams .............. A63F 13/795 700/92
2002/0059006 A1* 5/2002 Costin, IV ............. A63B 69/36 700/92
(Continued)

FOREIGN PATENT DOCUMENTS

GB 2508850 A * 6/2014 ............... A63F 3/08

OTHER PUBLICATIONS

"Rules of Handicapping," Effective Jan. 2020, United States Golf Association (2019).

*Primary Examiner* — Steven J Hylinski
(74) *Attorney, Agent, or Firm* — IPTechLaw

(57) ABSTRACT

Implementations of a system of enabling remote head to head golf play may include: a hole rating calculation module for calculating a course component of a hole rating and a hole handicap component of a hole using a hole par and a first predetermined percentage of a course rating and further for calculating the hole handicap component by using the hole's nine hole handicap rating value and a second predetermined percentage of the course rating; a score receiving module; a hole differential calculating module for calculating a plurality of hole differential scores for each player; a hole score sorting module for sorting each player's hole differential scores within a front nine holes and within a back nine holes; a hole delta calculating module for calculating a set of delta values between the players' differential scores; and a score reporting module for reporting which player won the head to head round.

20 Claims, 10 Drawing Sheets

(51) Int. Cl.

*A63B 71/06* (2006.01)
*A63F 13/46* (2014.01)
*A63F 3/08* (2006.01)

(52) U.S. Cl.

CPC .......... *A63F 13/46* (2014.09); *A63B 2225/20* (2013.01); *A63F 2003/088* (2013.01); *A63F 2300/572* (2013.01); *A63F 2300/8011* (2013.01)

(56) References Cited

U.S. PATENT DOCUMENTS

2014/0114451 A1* 4/2014 Kerr .................... G06F 16/9535
700/91
2024/0108991 A1* 4/2024 McGarvey ............ A63F 13/812

* cited by examiner

SYSTEMS AND METHODS FOR REMOTE GOLF MATCH PLAY

CROSS REFERENCE TO RELATED APPLICATIONS

This document claims the benefit of the filing date of U.S. Provisional Patent Application 63/261,976 ('976 Provisional), entitled "Systems and Methods for Remote Golf Match Play" to Richard Lesniak which was filed on Oct. 1, 2021, the disclosure of which is hereby incorporated entirely herein by reference.

BACKGROUND

1. Technical Field

Aspects of this document relate generally to systems and methods, such as systems and methods for playing games. More specific implementations involves golf games.

2. Background

Golf is played on a course with a specific design that provides various obstacles (distance, sand traps, water hazard, etc.) designed to challenge the player as they seek to place their golf ball in the cup on the green of a golf hole. Golf matches involve two or more players competing with each other.

SUMMARY

Implementations of a method of enabling remote head to head golf play, may include using a processor and a hole rating calculation module, calculating a course component of a hole rating using a hole par and a first predetermined percentage of a course rating; using the processor and the hole rating calculation module, calculating a hole handicap component of the hole using a hole handicap rating value and a second predetermined percentage of the course rating; and using the processor and a score receiving module, receiving a plurality of hole scores from a first player and from a second player via a first computer interface on a first computing device associated with the first player and via a second computer interface on a second computing device associated with the second player. The method may include, using the processor and a hole differential calculating module, calculating a plurality of hole differential scores for each player; using the processor and a hole score sorting module, sorting each player's hole differential scores within a front nine holes and within a back nine holes using the hole rating from hardest to easiest; using the processor and a hole delta calculating module, calculating a set of delta values between the first player's sorted hole differential scores and the second player's sorted hole differential scores; and, using the processor and a score reporting module and a predetermined delta threshold and the set of delta values, reporting to the first player and to the second player which won each hole, and which holes involved player ties using a third computer interface on the first computing device and a fourth computer interface on the second computing device, respectively.

Implementations of a method of enabling remote head to head golf play may include one, all, or any of the following:

The first predetermined percentage may be between 50% to 90% and the second predetermined percentage may be between 50% to 10%.

The second predetermined percentage of the course rating may be calculated by subtracting 100 from the first predetermined percentage of the course rating.

The course component of a specific hole rating may be calculated by the hole rating calculating module using a United States Golf Association course rating for the golf course using an 18 hole par for the golf course and a par value for the specific hole.

The hole handicap component of the hole rating for a front nine and back nine holes may be calculated using a hole's nine hole United States Golf Association's hole handicap rating value of the hole, a nine hole sum of the United States Golf Association's hole handicap rating values of a front 9 holes of the golf course, and a nine hole sum of a United States Golf Association's hole handicap rating values of a back 9 holes of the golf course.

The nine hole sum of the United States Golf Association hole handicap rating values of the front nine holes of the golf course may be equal to 45.

Half of the course rating may be allocated to the front nine holes and the remaining half to the back nine holes of the golf course.

The pro rata allocation of handicap may be formed where one or more harder holes in the front nine holes and one or more harder holes in the back nine holes get more allocation of the hole handicap rating than one or more easier holes in the front nine holes and in the back nine holes, respectively.

Implementations of a system of enabling remote head to head golf play may include one or more processors configured to execute a hole rating calculation module configured to calculate a course component of a hole rating and a hole handicap component of a hole where the hole rating calculation module calculates the course component of a hole rating using a hole par and a first predetermined percentage of a course rating and where the hole calculation module further calculates the hole handicap component by using the hole's nine hole handicap rating value and a second predetermined percentage of the course rating. The system may include a score receiving module configured to receive a plurality of hole scores from a first player and from a second player using a first computer interface on a first computing device associated with the first player and via a second computer interface on a second computing device associated with the second player; a hole differential calculating module configured to calculate a plurality of hole differential scores for each player; and a hole score sorting module configured to sort each player's hole differential scores within a front nine holes and within a back nine holes using the hole rating from hardest to easiest. The system nay also include a hole delta calculating module configured to calculate a set of delta values between the first player's sorted hole differential scores and the second player's sorted hole differential scores; and a score reporting module configured to report the set of delta values to the first player and to the second player to inform which player which player won each hole and which holes involved player ties using a third interface on the first computing device and a fourth computer interface on the second computing device, respectively.

Implementations of a system for enabling remote head to head golf play may include one, all, or any of the following:

The hole rating calculation module may use a first predetermined percentage that may be between 50% to 90% and the second predetermined percentage of the course rating that may be between 50% to 10% where the second predetermined percentage of the course rating may be calculated by subtracting 100 from the first predetermined percentage of the course rating.

The hole rating calculating module may use a United States Golf Association course rating for the golf course, an 18 hole par for the golf course and a par value for a specific hole for calculating the course component of a hole rating.

The hole rating calculating module may use a hole's nine hole United States Golf Association hole handicap rating value of the hole, a nine hole sum of the United States Golf Association hole handicap rating values of a front nine holes of the golf course, and a nine hole sum of the United States Golf Association hole handicap rating values of a back nine holes of the golf course for calculating the hole handicap component of the hole rating for the front nine and back nine holes.

The hole score sorting module may be configured to sort between a front nine and a back nine holes of the golf course, to sort using all 18 holes, or to sort using any subset or sub combination of the holes.

Half of the course rating may be allocated to a front nine holes and a remaining half to a back nine holes of the golf course and a pro rata allocation of handicap may be formed where one or more harder holes in the front nine holes and the back nine holes get more allocation of the hole handicap rating than one or more easier holes of the front nine holes and the back nine holes.

A method of enabling remote head to head golf play may include, using a processor and a hole rating calculation module, calculating a course component of a hole rating using hole par and a first predetermined percentage of a course rating; using the processor and the hole rating calculation module, calculating a hole handicap component of the hole using a hole handicap rating value and a second predetermined percentage of the course rating; and using the processor and the hole rating calculation module to allocate half of the course rating to a front set of holes and the remaining half to a back set of holes of the course. The method ma include, using the processor and by the hole rating calculation module tor allocate half of the hole handicap rating to the front set of holes and the remaining half to the back set of holes of the course; using the processor and the hole rating calculation module, calculating the hole rating by adding the course component with the hole handicap component; and, using the processor and a score receiving module, receiving a plurality of hole scores from a first player and from a second player using a first computing interface on a first computing device associated with the first player and via a second computer interface on a second computing device associated with the second player. The method may also include, using the processor and a hole differential calculating module, calculating a plurality of hole differential scores for the first player and a plurality of hole differential scores for the second player; using the processor and a hole score sorting module, sorting each player's hole differential scores within the front set of holes and within the back set of holes using the hole rating from hardest to easiest; and, using the processor and a hole delta calculating module, calculating a set of delta values between the first player's and the second player's sorted hole differential scores; and using the processor and a score reporting module and a predetermined delta threshold and the set of delta values, reporting to the first player and to the second player which player won each hole and which holes involved player ties using a third computing interface on the first computing device and a fourth computer interface on the second computing device, respectively.

Implementations of a method of enabling remote head to head golf play may include one, all, or any of the following:

The score receiving module may record hole-by-hole strokes, an adjusted gross score, or Stableford points.

The processor and the hole delta calculating module may create a delta value for each hole played by a first player and a second player by subtracting a set of ranked hole differential values for the front set of holes and the back set of holes of the first player and of the second player.

The processor and the hole differential calculating module may calculate a sum of the hole differential scores or hole-by-hole differential scores.

The processor and the score reporting module may use a predetermined delta threshold to determine which player won and for which holes the first play and the second player tied.

The predetermined delta threshold may be between +0.5 to −0.5 or between 0.25 to 0.75.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended systems and methods for remote golf match play will become apparent for use with particular implementations from this disclosure.

Accordingly, for example, although particular implementations are disclosed, such implementations and implementing components may comprise any shape, size, style, type, model, version, measurement, concentration, material, quantity, method element, step, and/or the like as is known in the art for such systems and methods for remote golf match play and implementing components and methods, consistent with the intended operation and methods.

The current United States Golf Association (USGA) rules use the principle of having all players play the same course on the same day to ensure equal play results in equivalent and comparable scores and forms an underlying process followed in all golf tournaments. One of the reasons why this is done is that the USGA permits adjustments of scores based on a playing conditions calculations on a given course provided at least eight players have posted a score on the same course that day. The other factor preventing USGA scoring processes from being able to allow for scores played by different players on different days on different courses to be equitably compared is that USGA scoring is tied entirely to the specific course and does not allow for hole by hole comparison, but just a comparison of the entire score for nine or eighteen holes for the specific course. A relevant summary of USGA handicapping and scoring can be found in Appendix B to the '976 Provisional previously incorporated by reference, the disclosure of which is hereby incorporated entirely herein by reference.

Implementation of systems and methods for remote golf match play disclosed herein enables two players to compete against each other using current USGA rules while still posting officially recognized scores. Not all golf players who wish to compete are able to play the same course or even reside in the same geographical location. The inability for players to use official USGA scoring, even with its use of handicap indexing to attempt to normalize scores on different courses on different days prevents remote competition for two or more players who can only play different courses (and particularly on different days/times). The ability to compete in rounds of golf played without being physically available on the same course playing head to head would increase the ability for players to find individuals to compete with as the potential pool of players can now be drawn from statewide, nationwide, or worldwide pools and is no longer course-specific.

Figure 1:
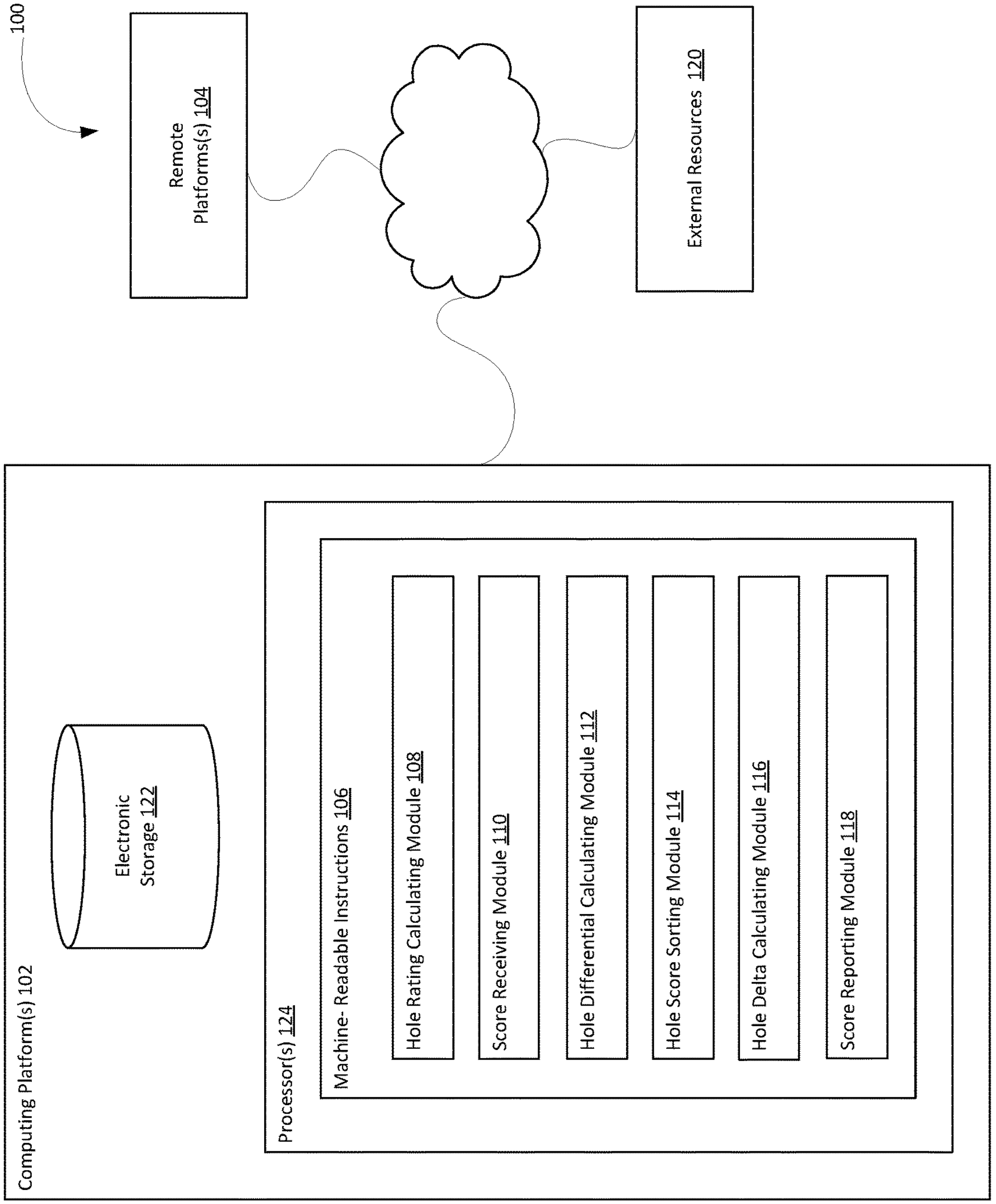
FIG. 1 is a block diagram of various modules of an implementation of a system for enabling remote golf match play.

FIG. 1 illustrates a system 100 including a computing platform 102. The computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access the system 100 via remote platform(s) 104. Computing platform(s) 102 may be configured by machine-readable instructions 106. Machine-readable instructions 106 may include one or more instruction modules. The instruction modules may include computer program modules. The instruction modules may include one or more of a hole rating calculating module 108, a score receiving module 110, a hole differential calculating module 112, a hole score sorting module 114, a hole delta calculating module 116, a score reporting module 118, and/or other instruction modules.

Figure 2:
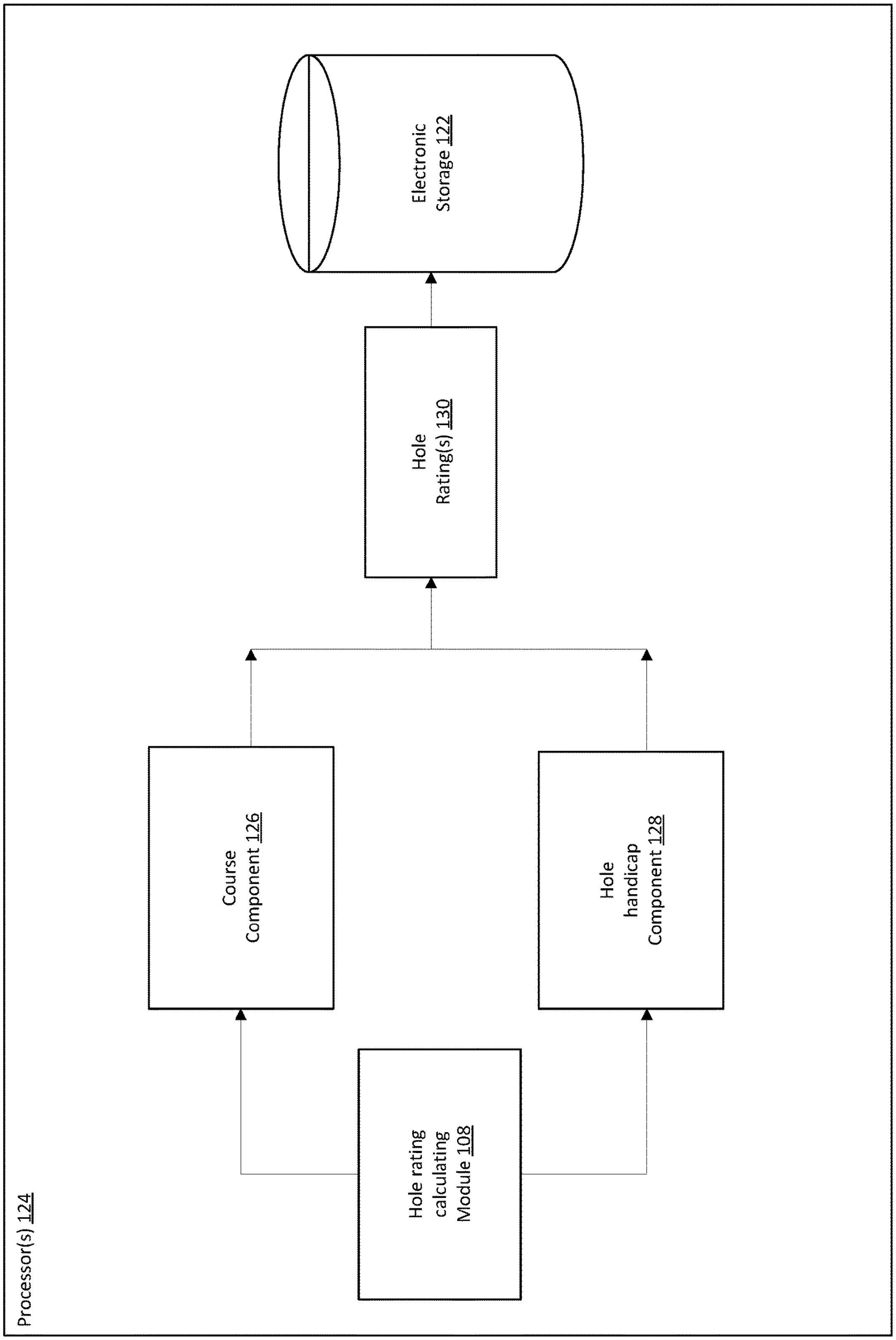
FIG. 2 is block diagram of an implementation of a system for enabling remote golf match play.

Referring to FIG. 2, a block diagram of an implementation of a system for calculating a one or more hole rating(s) 130 for one or more holes on any given golf course with a USGA slope and rating (or other similar rating by another golf association) by a processor 124 and a hole rating calculating module 108 is illustrated. The processor 124 and a hole rating calculating module 108 is first calculate a course component 126. The calculation involved in obtaining the course component 126 makes use of a hole par and a first predetermined percentage of a course rating and will be described in more detail hereafter.

Referring to FIG. 2 again, the processor 124 and the hole rating calculating module 108 calculates a hole handicap component 128 after calculating the course component 126. The hole calculating module 108 is configured to calculate the hole handicap component 128 using a hole par and a second predetermined percentage of the course rating. Subsequent to calculating the course component 126 and the hole handicap component 128, the hole rating calculation module 108 calculates one or more hole ratings 130 by adding the course component 126 and the hole handicap component 128. This normalized hole rating now allows for an apples to apples comparison to be made of different players' scores on the front nine and back nine holes of different golf courses with each other. The hole rating calculation module 108 then transmits the resulting one or more hole ratings 130 for one or more holes on each course being played by each player to the electronic storage/database 122. In one implementation the one or more hole ratings 130 for each hole are calculated and stored simultaneously as calculated by the hole ratings 130 calculating module 108.

Figure 3:
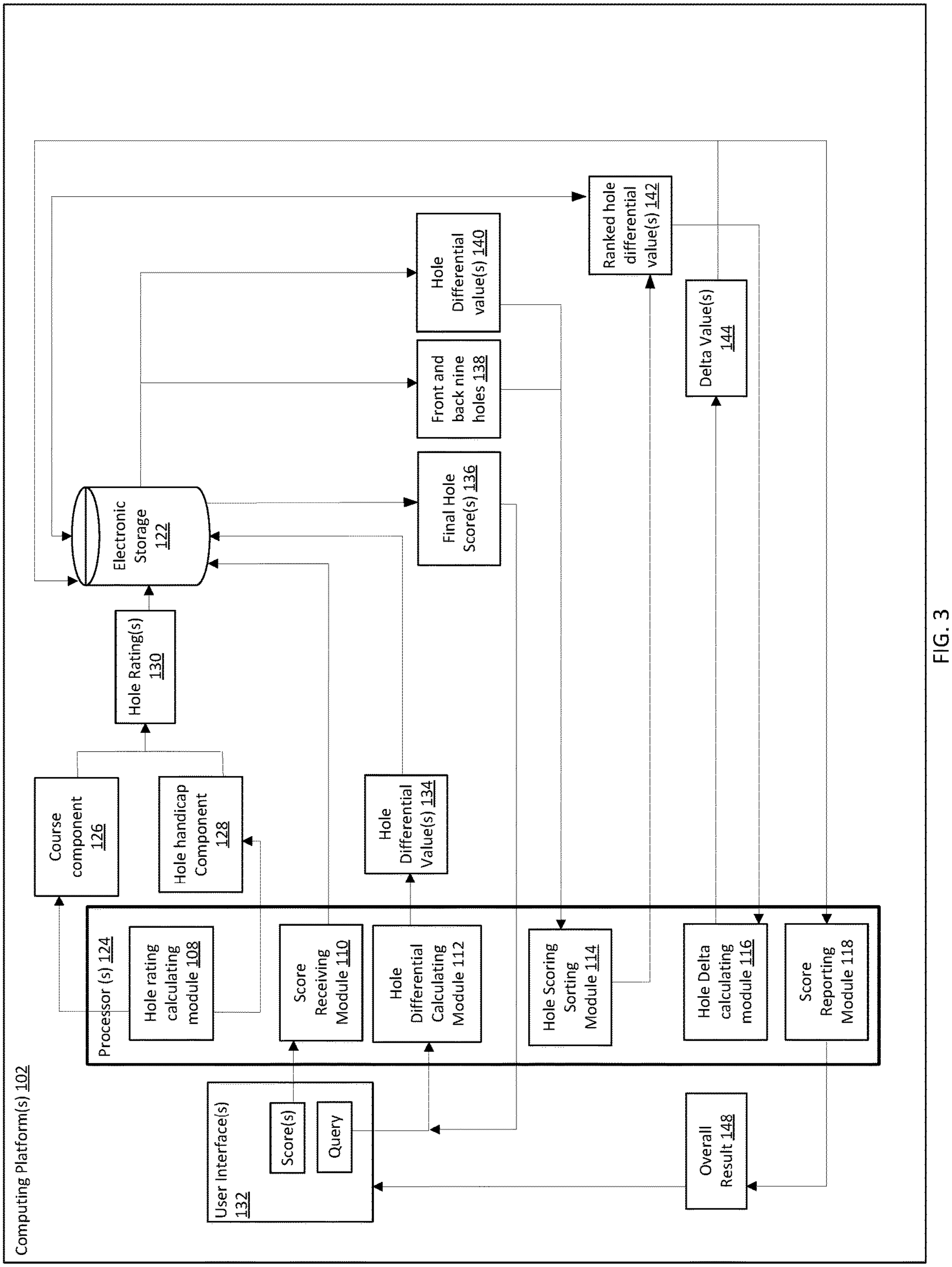
FIG. 3 is block diagram of an implementation of a system for enabling remote golf match play.

Referring to FIG. 3, a block diagram of an implementation of a system illustrating a score receiving module 110 is illustrated shown at a different level of detail. The score receiving module 110 is configured to record one or more players hole-by-hole scores during the golf game play. The score receiving module receives hole-by-hole scores when one or more players enter the scores using one or more user interfaces 132. Various system and method implementations may be adapted to work with any of a wide variety of methods of scoring, including, by non-limiting example, hole-by-hole strokes (scores), an adjusted gross score, or Stableford points. The score receiving module 110 transmits the hole-by-hole scores until the final scores are obtained to the electronic storage/database 122.

Referring to FIG. 3 again, once the final scores are transmitted and stored in the electronic storage 122 or upon request by either or both players, a hole differential calculating module 112 is configured to calculate a set of hole differential values 134 for each hole played by each player on each course. The set of hole differential values 134 for each player are then transmitted to the electronic storage 122.

Figure 4:
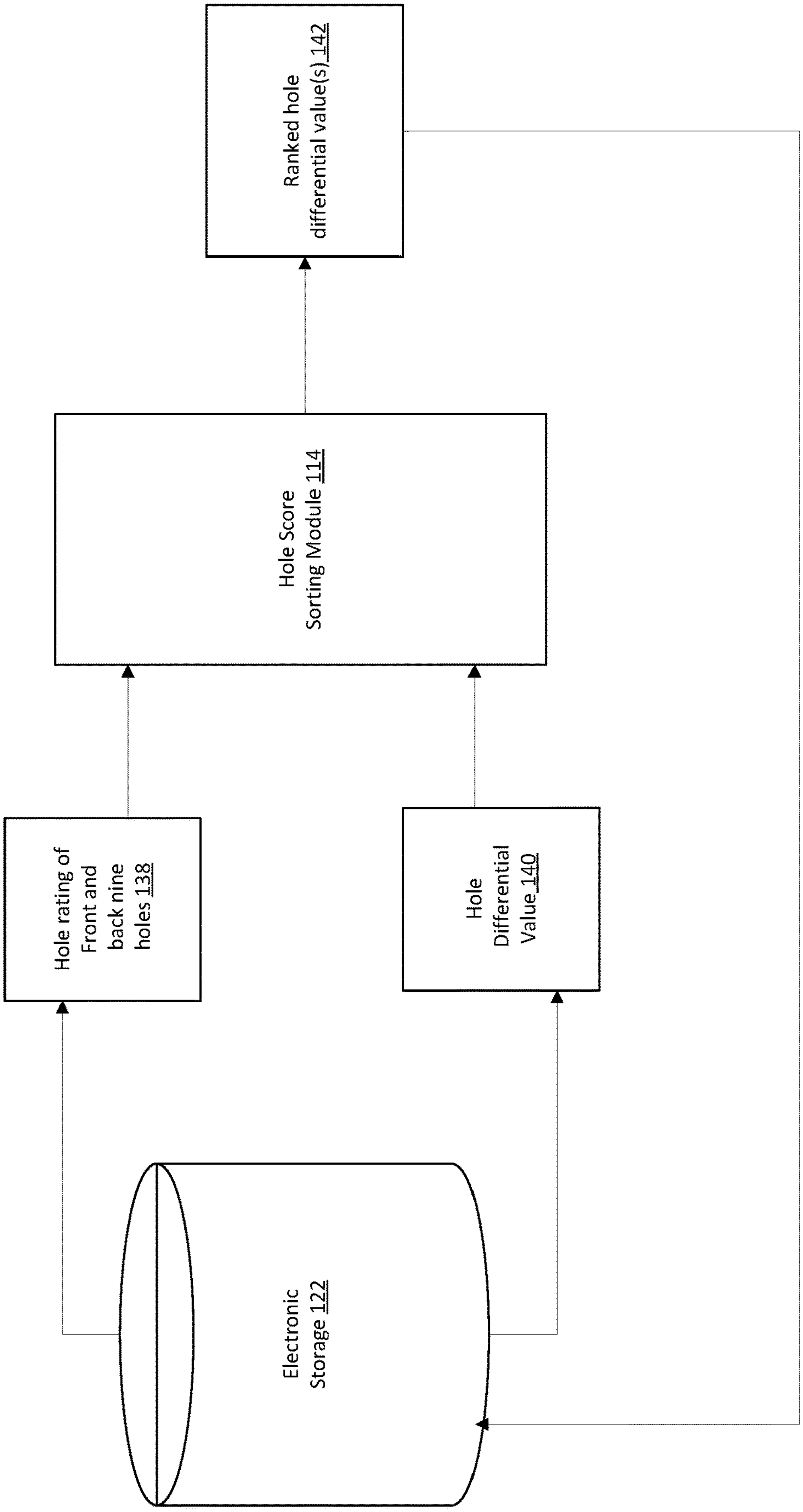
FIG. 4 is a block diagram of an implementation of a hole score sorting module enabling ranking differential values for a front and back nine holes and the calculated hole differential values.

Referring to FIG. 4, a block diagram is illustrated of an implementation using a hole score sorting module 114 for sorting the front and back nine holes and the calculated hole differential values 140 for each player from hardest to easiest using the hole rating value for each front and the back holes 138 is illustrated. In other implementations, the sorting may take place using all eighteen holes, more than eighteen holes, less than eighteen holes total, or any subset or subcombination of the holes other than a front and back nine holes. The hole score sorting module 114 uses the hole rating values for the front and the back nine holes 138 and the hole differential values 140 for each player from the electronic storage 122. In this way, the hole differential values 140 for the two hardest holes in the front nine of each of the different golf courses are compared to each other and so on, assisting in an apples to apples comparison of the differential values made by each player during play. The lists of ranked hole differential values 142 are then transmitted to the electronic storage 122 by the hole score sorting module 114.

Referring to FIG. 3 again, the set of instruction modules includes a hole delta calculating module 116 which uses the set of ranked hole differential values 142 for the front nine and the back nine holes and subtracts one player's set of hole differential values 142 from the other player's set of hole differential values 142 to create a delta value for each hole played, forming a set of delta values 144. The set of delta values 144 for each hole are then transmitted to the electronic storage 122 by the hole delta calculating module 116. In some implementations, however, the sum of the hole differentials (for 9 holes, 18 holes, or any other number of holes disclosed herein) may be transmitted to the electronic store 122 instead of hole-by-hole differentials.

Figure 5:
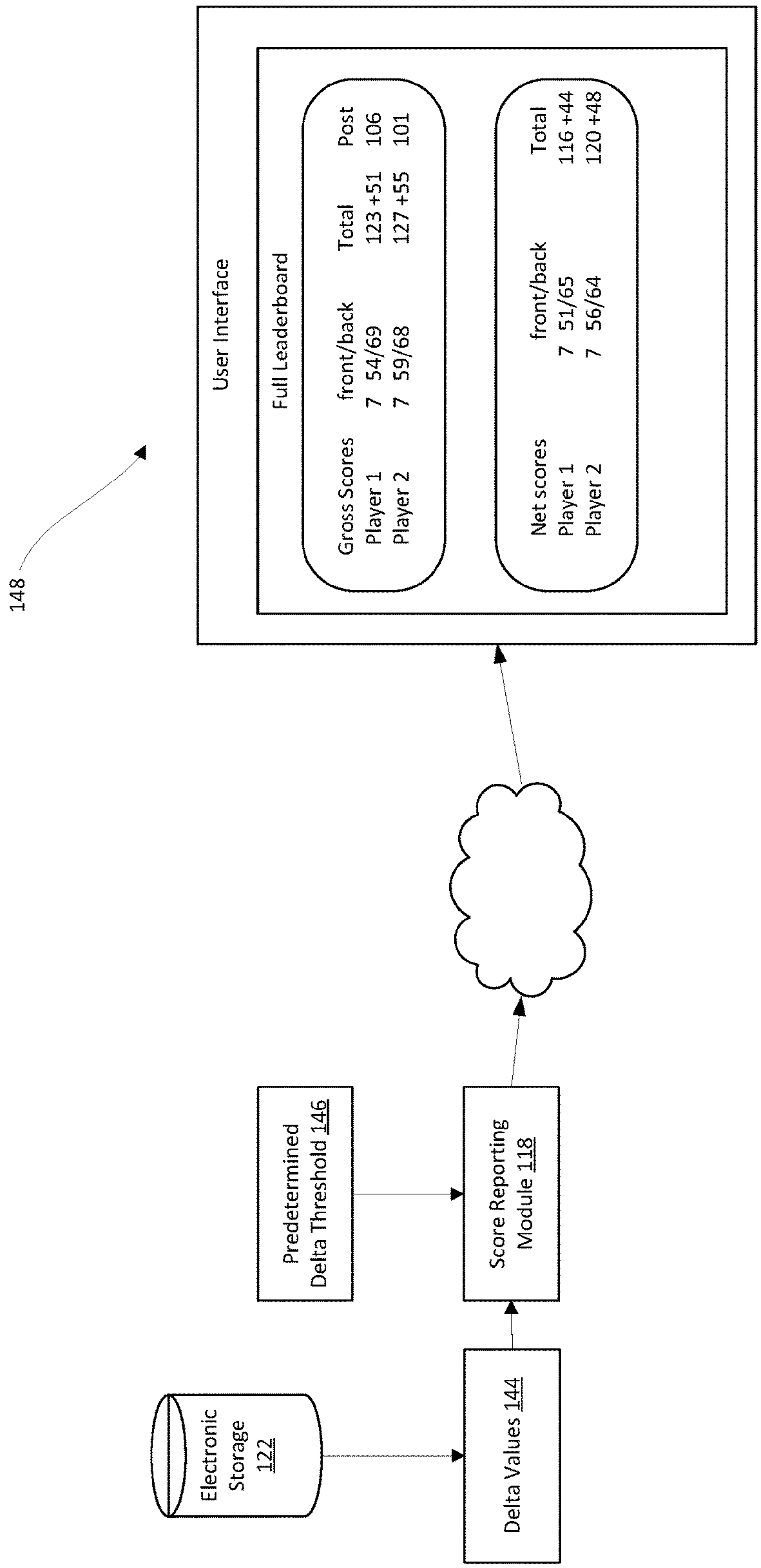
FIG. 5 is a block diagram of an implementation of a system and a diagram of a user interface for displaying a score on the user interface.

Referring to FIG. 5, the set of instruction modules includes a score reporting module 118 for determining which player won which hole and for which holes the players tied. In order to determine the winner, the score reporting module uses the set of delta values 144 calculated by the hole delta calculating module 116 and stored in the electronic storage 122 and compares it with a predetermined delta threshold value 146. The score reporting module 118 then reports to each player the list of holes won, tied, and lost based on the set of delta values and the player who won the most holes therefore winning the remote head to head match. In various implementations, the score reporting module 118 may transmit information regarding the list of holes won, tied, and lost, and the overall result to each player over a telecommunication network to a portable computing device associated with each player using a graphical user interface configured on each portable computing device. In implementations where low gross score or low net score is used as the deciding factor to determine a winner, the sum of the hole differentials for each player for 9 or 18 holes (or any other number of holes disclosed herein) may be used and compared with an overall differential delta threshold value to determine the winning player and for reporting.

Various functions of the hole rating calculating module 108, the score receiving module 110, hole differential calculating module 112, hole score sorting module 114, hole delta calculating module 116, and score reporting module 118 may be implemented using machine readable instructions 106 in a app associated with a portable computing device associated with each player.

In some implementations, computing platform(s) 102, remote platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 120 may be operatively linked via some other communication media.

Figure 6:
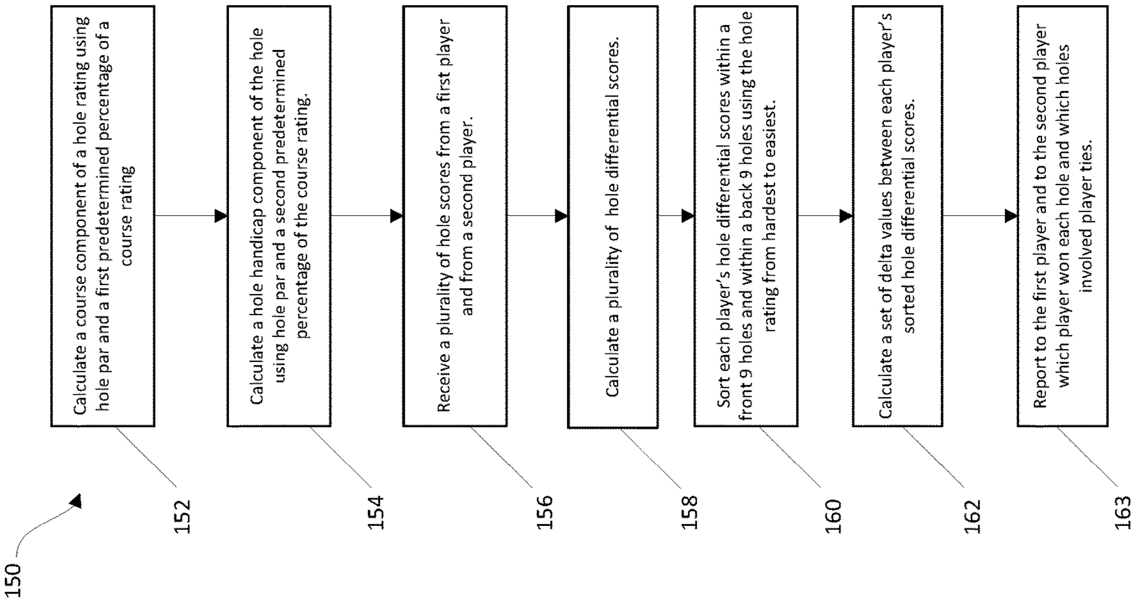
FIG. 6 is a flow diagram of an implementation of a method of enabling remote head to head golf play.

Referring to FIG. 6, an implementation of a method of enabling remote head to head golf play is illustrated. As illustrated, the method includes calculating a course component of a hole rating and a first predetermined percentage of a course rating. The purpose of calculating the hole rating is that it permits each hole on any given golf course with a USGA slope and rating (or other similar rating by another golf association) to be score normalized with any other hole on any other golf course. The use of the hole ratings permits an apples to apples comparison of hole by hole scores on different golf courses that is also time of play independent.

The method includes the step of calculating a course component to the hole rating using Equation 1, below:

$$CC = C\frac{X}{Y} * P \qquad \text{Equation 1}$$

Equation 1 uses a first predetermined percentage of a course rating and is denoted as C in the equation and CC is the resulting course component of the hole rating. The predetermined percentage C ranges between 50% to 90% in particular implementations. The equation also takes in account of USGA course rating for the golf course, an eighteen hole par for the golf course and par value for the specific hole being rated. In other implementations, the calculation of the course component may take place using all 18 holes or any subset or subcombination of the holes other than front and back nine holes (or any other number of holes disclosed in this document). The predetermined percentage value is designed to effectively allow for accounting for a predetermined percentage of the USGA course rating at the course component calculating stage of the hole rating calculation.

Referring to FIG. 5 again, after calculating the course component of the hole rating, the method includes the step of calculating a hole handicap component. The hole handicap component is calculated according to Equation 2 for a front nine holes of a course below (though the equation can be modified for another number of holes corresponding to a desired number of holes):

$$HC = (1 - C)\frac{X}{2} * \frac{10 - F}{\text{Front9}} \qquad \text{Equation 2}$$

In Equation 2, HC is the hole component of the hole rating and is calculated using hole par and a second predetermined percentage of a course rating. The Equation makes use of F, which is a hole's nine hole USGA hole handicap rating value; and Front9 is the nine sum of the USGA hole handicap rating values of the front nine holes of the golf course. The Front9 value may, in various implementations where nine holes are being used, equal 45 (1+2+3+4+5+6+7+8+9).

The hole handicap component for back nine holes of the course is calculated using Equation 3 as follows:

$$HC = (1 - C)\frac{X}{2} * \frac{10 - F}{\text{Back9}} \qquad \text{Equation 3}$$

Equation 3 uses Back9 which is the nine hole sum of the USGA hole handicap rating values of the back nine holes of the golf course (here nine holes are being used, but other desired numbers of holes could be used in various implementations). In other implementations, the calculation of the hole handicap component may take place using all 18 holes, more than 18 holes, less than 18 holes, or any subset or subcombination of the holes other than front and back nine holes.

The effect of the calculations in Equations 2 and 3 is to allocate half of the course rating to the front nine holes (first set of holes) and the remaining half to the back nine holes (second set of holes) of the course. The effect also forms a pro rata allocation of handicap where harder holes in the front nine and the back nine get more allocation of the hole handicap rating than easier holes. This is one of the reasons why the use of the nine hole handicap ratings for the holes is used rather than the eighteen hole handicap ratings. However, while the use of the nine hole USGA hole handicap ratings is illustrated in the implementation of Equations 2 and 3, any other hole handicap rating promulgated by a golf association designed to establish equivalent difficulty rating for holes on different golf courses may be used in various implementations. As illustrated, the remaining portion of the USGA course rating is applied in Equations 2 and 3 through subtracting the course component percentage from 1 (or 100 depending on how the percentage is expressed), so the hole handicap component may vary between about 50% to about 10% in various implementations.

Further, referring to FIG. 6, a flow chart of an implementation of a method of enabling remote head to head golf play is illustrated. As illustrated, the method includes calculating a course component of a hole rating using hole part and a first predetermined percentage of a course rating (step 152) and calculating a hole handicap component of the hole using hole par and a second predetermined percentage of the course rating (step 154). The method also includes receiving a plurality of hole scores from a first play and from a second player (step 156) which may take place using the various computer interfaces illustrated herein. The method also includes calculating a hole differential score/value (step 158), sorting each player's differential scores within a front 9 holes and within a back 9 holes using the hole rating from hardest to easiest (step 160), using the hole rating, and calculating a set of delta values between each hole in each player's set of sorted hole scores (step 162). The method also includes reporting which player had the lower delta value for each hole and therefore won the hole and which holes involved player ties (step 163). In various method implementations the method may also include reporting which player won the round based on the overall number of holes won.

Figure 7:
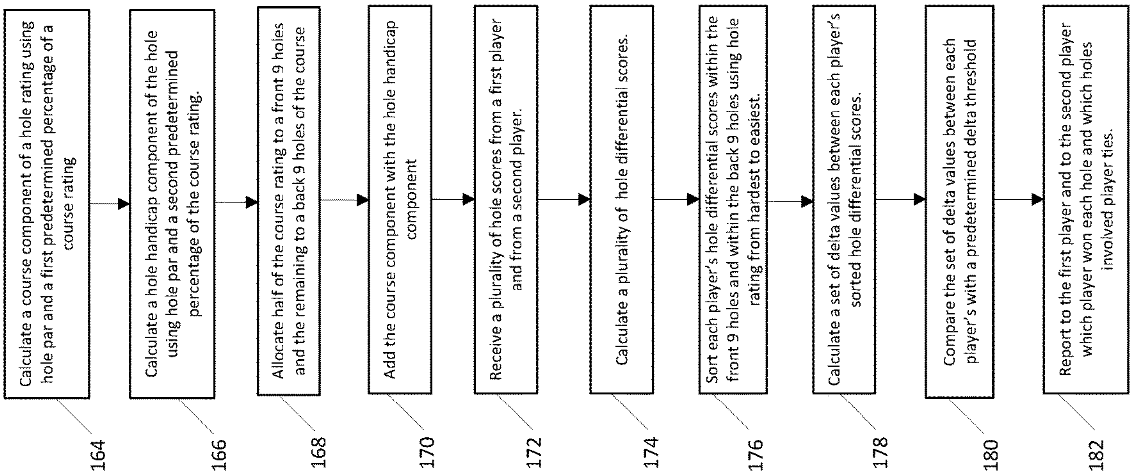
FIG. 7 is a flow diagram of an implementation of a method of enabling head to head golf play by using a hole rating calculating module providing a hole rating by adding course component and hole handicap component.

Referring to FIG. 7, a flow diagram of an implementation of a method of enabling head to head golf play is illustrated. As illustrated, the method includes calculating a course component of a hole rating using hole par and a first predetermined percentage of a course rating (step 164) and calculating a hole handicap component of the hole using a hole par and a second predetermined percentage of the course rating (step 166). The method also includes allocating half of the course rating to a front nine (or other quantity) holes and the remaining half of the course rating to a back nine (or other quantity) holes of the course (step 168). The method also includes creating a hole rating by adding the course component to the hole handicap component (step 170. The method also includes receiving a plurality of hole scores from a first player and from a second player (step 172). The first player and a second player record their hole-by-hole scores during play using a computer interface like those disclosed herein. Various system and methods may be adapted to work with any of a wide variety of methods of scoring, including, by non-limiting example, hole-by-hole strokes (scores), an adjusted gross score, or Stableford points. The method further includes calculating a plurality of hole differential scores (step 174) once the final score is obtained or upon request by either or both players. In various implementations, the hole differential score may be calculated using the following equation: Hole Differential=(113/Course slope)*(Hole score−Hole rating for that hole). The method also includes sorting the front and the back nine holes and the calculating hole differential values for each first player or the second player from hardest to easiest using the hole rating value for each hole. In this way, the hole differential values for the two hardest holes in the front nine of each of the different golf courses are compared to each other and so on, assisting in an apples to apples comparison of the differential values made by each player during play.

Referring to FIG. 7, the method includes creating a set of delta values using the set of ranked hole differential values for the front nine and the back nine holes by subtracting one first player's set of hole differential values from the second player's set of hole differential values to create a set of differential delta values that includes each hole played (step 178). In various implementations, the various method steps may involve storing the resulting values as created in the electronic storage 122. In some implementations, however, the sum of the hole differentials (for 9 holes or for 18 holes or another number of desired holes) may be transmitted to the electronic store 122 instead of the hole-by-hole differentials. The method may further include determining whether the first or second player won which hole(s) and for which hole(s) the first or second players tied using a predetermined delta threshold and the set of delta values (step 180). In various implementations, the predetermined delta threshold may be 0.5 (+/−0.5). In other implementations, however, the delta threshold may range between about 0.25 to about 0.75. The method also includes reporting the results to each players regarding the list of holes won, tied, and lost and the player who won the most and thus won the remote head to head match (step 182). In implementations where low gross score or low net score is used as the deciding factor to determine a winner, the sum of the hole differentials for each player for 9 or 18 holes (or another number of holes disclosed herein) may be used and compared with an overall differential delta threshold value to determine the winning player and for reporting the same.

Figure 8:
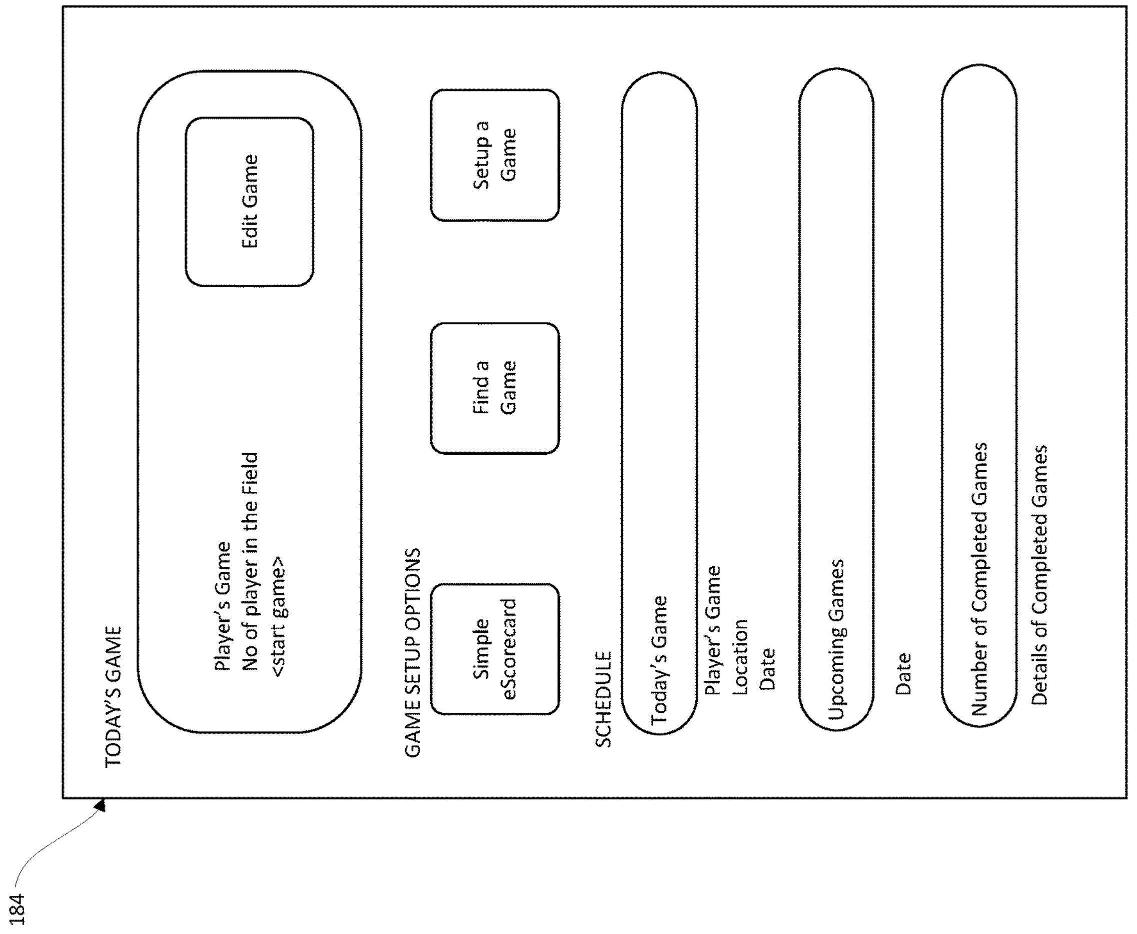
FIG. 8 is a implementation of a user interface for the implementation of the method and system of enabling head to head golf play showing details of remote golf game play.

Referring to FIG. 8, an implementation of a user interface used by a player for data entry is illustrated. This user interface may be generated using a portable computing device associated with the player like a smartphone, tablet, smartwatch, or laptop. As illustrated, the interface 184 includes areas for the one or more players to select a game, a location, set up a game, view the score cards remotely, edit a game, and locate other available players without having to be physically located at the same particular golf courses. Various user interfaces for data entry by a player may also include areas for entry of scores by hole so the system can receive the hole-by-hole scores from each player.

Figure 9:
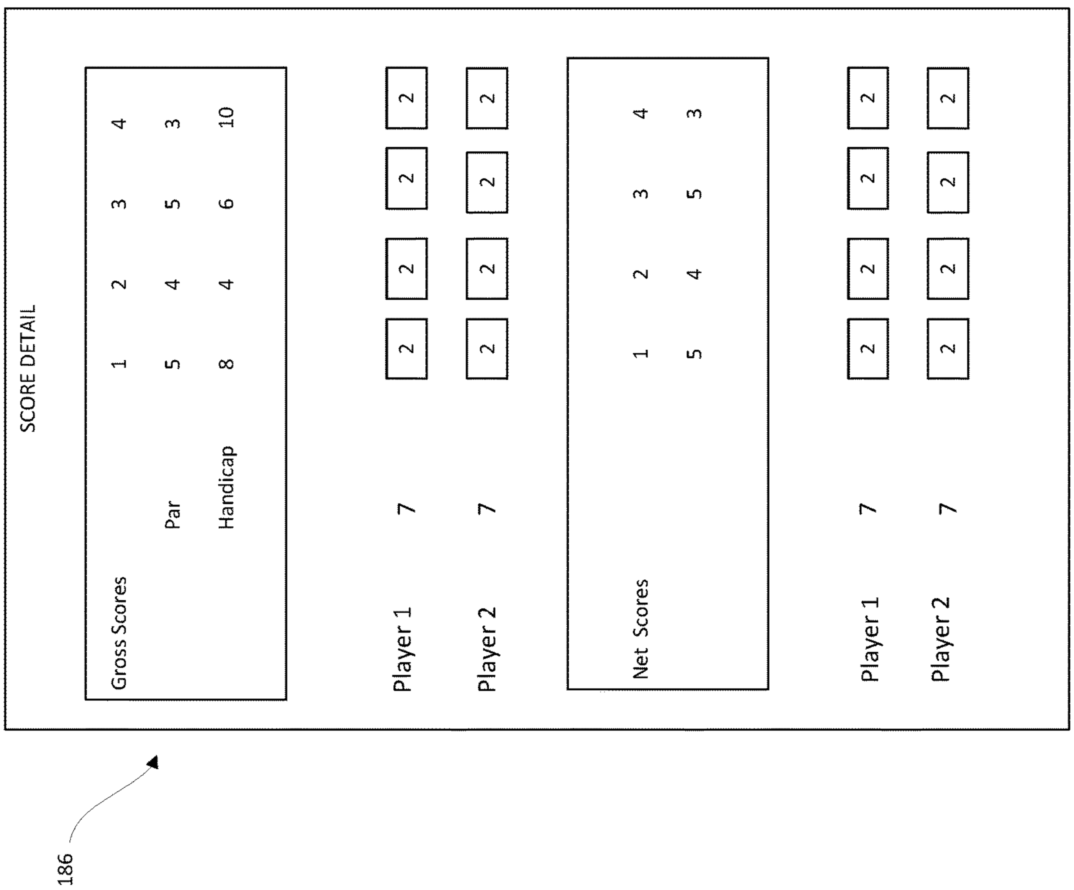
FIG. 9 illustrates an implementation of a user interface illustrating the detailed scores of two players competing against each other in a golf game.

Referring to FIG. 9, an implementation of a user interface illustrating the detailed sores of two players competing remotely against each other in a golf game is illustrated. As illustrated, the players can see gross and net scores and each player's scoring at each hole as each player enters the hole-by-hole scores. The score detail interface's gross scores and the net scores in this implementation are based on par and the handicap component.

Figure 10:
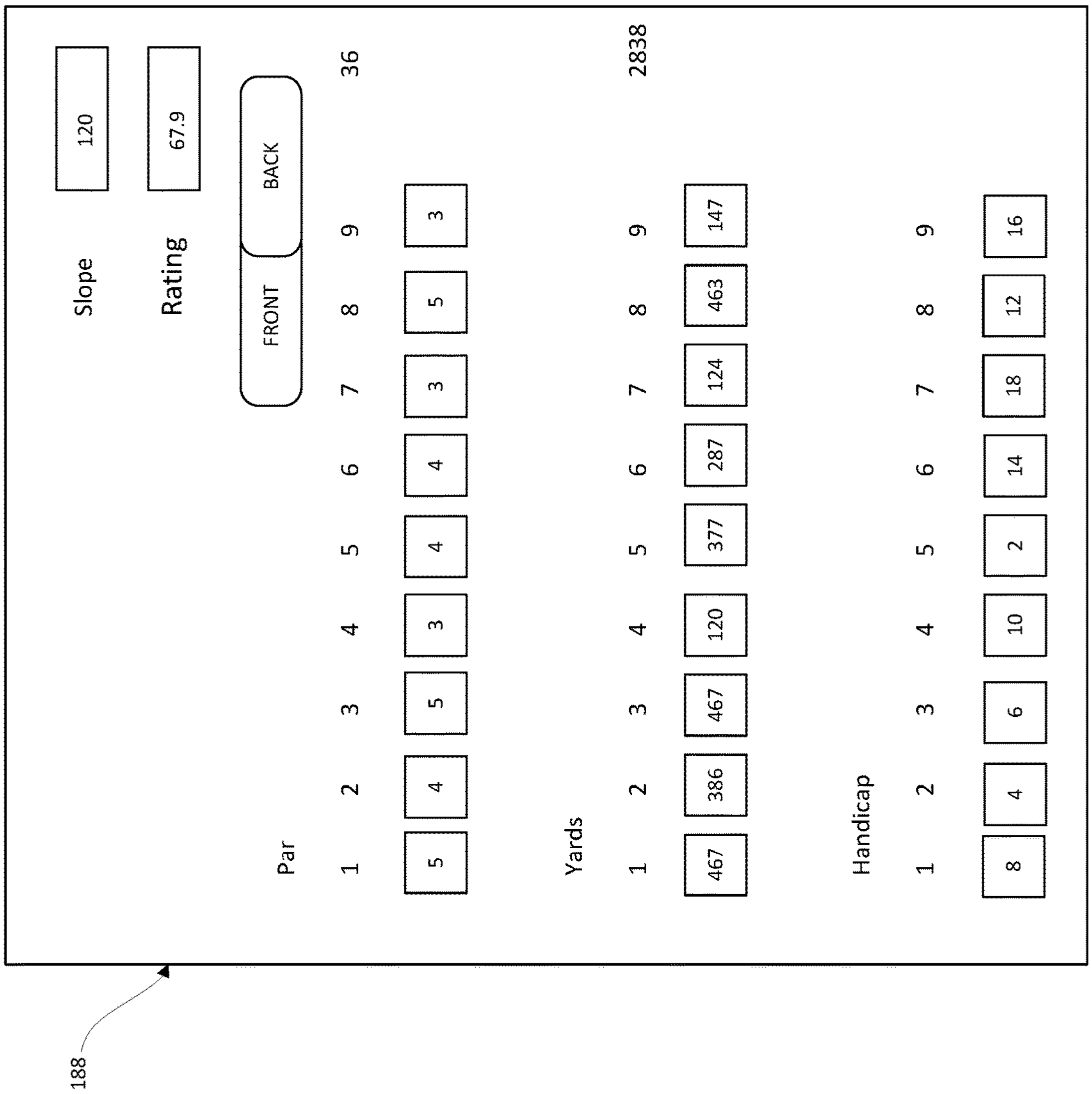
FIG. 10 illustrates an implementation of a user interface with a detailed values assigned to par, yards, and handicap for the front and back holes.

Referring to FIG. 10, a user interface implementation is illustrated that shows the detailed values assigned to par, yards, and handicap for the front and back holes. This the user interface 188 illustrates normalized hole rating for an apples to apples comparison to be made of different players' scores on the front nine and back nine holes of different golf courses with each other. Additional user interface(es) may be included that may be displayed/generated by a portable computing system/computing system associated with each player that also show, by non-limiting example, the player the holes won/lost/tied, the set of delta values, the player who won the round(s), and other desired information regarding each player's performance/relative performance. Because the comparison is being done by the system separate from each golf course's system for recording and reporting official scores for each player, each player is able to record an official score on each golf course and still find out which player won their competition via the system and method implementations disclosed herein. Because of this, the present system allows players to complete without having to affect their official handicaps or deal with the issues of not recording official scores when playing at their golf course of choice/one located near them. In this way the issue of not having a golf partner to compete with locally can be resolved using the system and methods disclosed herein.

The implementations listed here, and many others, will become readily apparent from this disclosure. From this, those of ordinary skill in the art will readily understand the versatility with which this disclosure may be applied. In places where the description above refers to particular implementations of systems and methods for remote golf match play and implementing components, sub-components, methods and sub-methods, it should be readily apparent that a number of modifications may be made without departing from the spirit thereof and that these implementations, implementing components, sub-components, methods and sub-methods may be applied to other systems and methods for remote golf match play.

What is claimed is:

1. A method of enabling remote head to head golf play, the method comprising:

while a first player is playing golf on a first golf course having a first eighteen holes and a second player is playing golf on a second golf course having a second eighteen holes:

for each first hole of the first eighteen holes of the first golf course:

using a processor and a hole rating calculation module, calculating a first course component of a first hole rating using a first hole par and a first predetermined percentage of a first course rating;

using the processor and the hole rating calculation module, calculating a first hole handicap component of the first hole using a first hole handicap rating value and a second predetermined percentage of the first course rating; and for each second hole of the second eighteen holes of the second golf course:

using a processor and a hole rating calculation module, calculating a second course component of a second hole rating using a second hole par and a second predetermined percentage of a second course rating; and using the processor and the hole rating calculation module, calculating a second hole handicap component of the second hole using a second hole handicap rating value and a second predetermined percentage of the second course rating; and using the processor and a score receiving module, receiving a plurality of first hole scores from the first player and a plurality of second hole scores from tie second player via a first computer interface on a first computing device associated with the first player and via a second computer interface on a second computing device associated with the second player;

using the processor and a hole differential calculating module, calculating a first plurality of hole differential scores for the first player and calculating a second plurality of hole differential scores for the second player;

using the processor and a hole score sorting module, sorting each player's hole differential scores within a front nine holes and within a back nine holes using the hole rating from hardest to easiest;

using the processor and a hole delta calculating module, calculating a set of delta values between the first player's sorted hole differential scores and the second player's sorted hole differential scores; and using the processor and a score reporting module and a predetermined delta threshold and the set of delta values, reporting to the first player and to the second player which won each hole, and which holes involved player ties using a third computer interface on the first computing device and a fourth computer interface on the second computing device, respectively.

2. The method of claim 1, wherein the first predetermined percentage is between 50% to 90% and the second predetermined percentage is between 50% to 10%.

3. The method of claim 1, wherein the second predetermined percentage of the course rating is calculated by subtracting 100 from the first predetermined percentage of the course rating.

4. The method of claim 1, wherein the first course component of a specific first hole rating is calculated by the hole rating calculating module using a United States Golf Association course rating for the first golf course using an 18 hole par for the first golf course and a par value for the specific first hole; and wherein the second course component of a specific second hole rating is calculated by the hole rating calculating module using a United States Golf Association course rating for the second golf course using an 18 hole par for the second golf course and a par value for the specific second hole.

5. The method of claim 1, wherein the first hole handicap component of the first hole rating for a front nine and back nine holes of the first golf course is calculated using a hole's nine hole United States Golf Association's hole handicap rating value of the hole, a nine hole sum of the United States Golf Association's hole handicap rating values of a front 9 holes of the golf course, and a nine hole sum of a United States Golf Association's hole handicap rating values of a back 9 holes of the first golf course; and wherein the second hole handicap component of the second hole rating for a front nine and back nine holes of the second golf course is calculated using a hole's nine hole United States Golf Association's hole handicap rating value of the hole, a nine hole sum of the United States Golf Association's hole handicap rating values of a front 9 holes of the golf course, and a nine hole sum of a United States Golf Association's hole handicap rating values of a back 9 holes of the second golf course.

6. The method of claim 5, wherein the nine hole sum of the United States Golf Association hole handicap rating values of the front nine holes of the first golf course and the front nine holes of the second golf course is equal to 45.

7. The method of claim 6, wherein half of the course rating is allocated to the front nine holes and the remaining half to the back nine holes of the first golf course; and wherein half of the course rating is allocated to the front nine holes and the remaining half to the back nine holes of the second golf course.

8. The method of claim 7, wherein for both the first golf course and the second golf course, a pro rata allocation of handicap is formed where one or more harder holes in the front nine holes and one or more harder holes in the back nine holes get more allocation of the hole handicap rating than one or more easier holes in the front nine holes and in the back nine holes, respectively.

9. A system of enabling remote head to head golf play, the system comprising:

one or more processors configured to execute:

a hole rating calculation module configured to calculate a course component of a hole rating and a hole handicap component of a hole where the hole rating calculation module calculates the course component of a hole rating using a hole par and a first predetermined percentage of a course rating and where the hole calculation module further calculates the hole handicap component by using the hole's nine hole handicap rating value and a second predetermined percentage of the course rating;

a score receiving module configured to receive a plurality of hole scores from a first player and from a second player using a first computer interface on a first computing device associated with the first player and via a second computer interface on a second computing device associated with the second player;

a hole differential calculating module configured to calculate a plurality of hole differential scores for each player;

a hole score sorting module configured to sort each player's hole differential scores within a front nine holes and within a back nine holes using the hole rating from hardest to easiest;

a hole delta calculating module configured to calculate a set of delta values between the first player's sorted hole differential scores and the second player's sorted hole differential scores; and a score reporting module configured to report the set of delta values to the first player and to the second player to inform which player which player won each hole and which holes involved player ties using a third interface on the first computing device and a fourth computer interface on the second computing device, respectively.

10. The system of claim 9, wherein the hole rating calculation module uses a first predetermined percentage that is between 50% to 90% and the second predetermined percentage of the course rating that is between 50% to 10%; and wherein the second predetermined percentage of the course rating is calculated by subtracting 100 from the first predetermined percentage of the course rating.

11. The system of claim 9, wherein the hole rating calculating module uses a United States Golf Association course rating for the golf course, an 18 hole par for the golf course and a par value for a specific hole for calculating the course component of a hole rating.

12. The system of claim 9, wherein the hole rating calculating module uses a hole's nine hole United States Golf Association hole handicap rating value of the hole, a nine hole sum of the United States Golf Association hole handicap rating values of a front nine holes of the golf course, and a nine hole sum of the United States Golf Association hole handicap rating values of a back nine holes of the golf course for calculating the hole handicap component of the hole rating for the front nine and back nine holes.

13. The system of claim 9, wherein the hole score sorting module is configured to sort between a front nine and a back nine holes of the golf course, to sort using all 18 holes, or to sort using any subset or sub combination of the holes.

14. The system of claim 9, wherein half of the course rating is allocated to a front nine holes and a remaining half to a back nine holes of the golf course and a pro rata allocation of handicap is formed where one or more harder holes in the front nine holes and the back nine holes get more allocation of the hole handicap rating than one or more easier holes of the front nine holes and the back nine holes.

15. A method of enabling remote head to head golf play, the method comprising:

using a processor and a hole rating calculation module, calculating a course component of a hole rating using hole par and a first predetermined percentage of a course rating;

using the processor and the hole rating calculation module, calculating a hole handicap component of the hole using a hole handicap rating value and a second predetermined percentage of the course rating;

using the processor and the hole rating calculation module to allocate half of the course rating to a front set of holes and the remaining half to a back set of holes of the course;

using the processor and by the hole rating calculation module to allocate half of the hole handicap rating to the front set of holes and the remaining half to the back set of holes of the course;

using the processor and the hole rating calculation module, calculating the hole rating by adding the course component with the hole handicap component;

using the processor and a score receiving module, receiving a plurality of hole scores from a first player and from a second player using a first computing interface on a first computing device associated with the first player and via a second computer interface on a second computing device associated with the second player;

using the processor and a hole differential calculating module, calculating a plurality of hole differential scores for the first player and a plurality of hole differential scores for the second player;

using the processor and a hole score sorting module, sorting each player's hole differential scores within the front set of holes and within the back set of holes using the hole rating from hardest to easiest;

using the processor and a hole delta calculating module, calculating a set of delta values between the first player's and the second player's sorted hole differential scores; and using the processor and a score reporting module and a predetermined delta threshold and the set of delta values, reporting to the first player and to the second player which player won each hole and which holes involved player ties using a third computing interface on the first computing device and a fourth computer interface on the second computing device, respectively.

16. The method of claim 15, wherein the score receiving module records hole-by-hole strokes, an adjusted gross score, or Stableford points.

17. The method of claim 15, wherein the processor and the hole delta calculating module create a delta value for each hole played by a first player and a second player by subtracting a set of ranked hole differential values for the front set of holes and the back set of holes of the first player and of the second player.

18. The method of claim 15, wherein the processor and the hole differential calculating module calculate a sum of the hole differential scores or hole-by-hole differential scores.

19. The method of claim 15, wherein the processor and the score reporting module uses a predetermined delta threshold to determine which player won and for which holes the first play and the second player tied.

20. The method of claim 19, wherein the predetermined delta threshold is between +0.5 to −0.5 or between 0.25 to 0.75.

* * * * *